US012584298B2

(12) United States Patent
Burke et al.

(10) Patent No.: US 12,584,298 B2
(45) Date of Patent: Mar. 24, 2026

(54) BACKFLOW ALERT SYSTEM

(71) Applicant: WATTS REGULATOR CO., North Andover, MA (US)

(72) Inventors: Joseph Michael Burke, Deerfield, NH (US); Ian David Baynes, Merrimac, MA (US); Steven Castrigno, Chester, NH (US)

(73) Assignee: WATTS REGULATOR CO., North Andover, MA (US)

( * ) Notice: Subject to any disclaimer, the term of this patent is extended or adjusted under 35 U.S.C. 154(b) by 176 days.

(21) Appl. No.: 18/407,136

(22) Filed: Jan. 8, 2024

(65) Prior Publication Data

US 2024/0200313 A1     Jun. 20, 2024

Related U.S. Application Data

(63) Continuation-in-part of application No. PCT/US2021/062336, filed on Dec. 8, 2021, and a
(Continued)

(51) Int. Cl.
E03B 7/07 (2006.01)
G08B 25/00 (2006.01)
(Continued)

(52) U.S. Cl.
CPC .............. E03B 7/077 (2013.01); E03B 7/071 (2013.01); G08B 25/006 (2013.01); E03B 7/072 (2013.01);
(Continued)

(58) Field of Classification Search
CPC .......... E03B 7/077; E03B 7/071; E03B 7/072; G08B 25/006; G01F 15/005;
(Continued)

(56) References Cited

U.S. PATENT DOCUMENTS 3,283,772 A * 11/1966 Ensign .................... E03C 1/106
                                                137/115.11
3,695,104 A    10/1972 Mannherz et al.
(Continued)

FOREIGN PATENT DOCUMENTS

EP     3455596 A1    3/2019
WO     0165212 A1    9/2001
(Continued)

OTHER PUBLICATIONS

WATTS Engineering Specification, Air Gaps, Elbows, and Test Cocks for Reduced Pressure Zone Assemblies, 2023, 2 pages.
(Continued)

*Primary Examiner* — Minh Q Le
(74) *Attorney, Agent, or Firm* — Grossman, Tucker, Perreault & Pfleger, PLLC

(57) ABSTRACT

A sprinkler backflow alert system includes a sprinkler system, a building fire panel, a backflow preventor including at least one shut-off valve, a fluid detection system, and a tamper switch. The backflow preventor may be fluidly coupled upstream of the sprinkler system. The fluid detection system is configured to detect a discharge of water from the backflow preventor and generate a water discharge signal corresponding to the backflow discharge. The tamper switch is configured to detect a change in a position of the at least one shut-off valve and generate a tamper signal in the event the at least one shut-off valve is closed or partially closed. When a backflow discharge event occurs, a signal is sent to the fire panel triggering the building fire alarm as well as sending an alert to the local fire department and facility owner.

19 Claims, 6 Drawing Sheets

Related U.S. Application Data continuation-in-part of application No. 17/115,682, filed on Dec. 8, 2020, now Pat. No. 12,188,213.

(60) Provisional application No. 63/438,763, filed on Jan. 12, 2023.

(51) Int. Cl.

| | |
|---|---|
| E03C 1/10 | (2006.01) |
| G01F 1/64 | (2006.01) |
| G01F 15/00 | (2006.01) |
| G01F 23/263 | (2022.01) |
| G01M 3/18 | (2006.01) |
| G01M 3/28 | (2006.01) |

(52) U.S. Cl.
CPC .............. *E03C 1/102* (2013.01); *E03C 1/106* (2013.01); *G01F 1/64* (2013.01); *G01F 15/005* (2013.01); *G01F 23/268* (2013.01); *G01M 3/184* (2013.01); *G01M 3/2876* (2013.01)

(58) Field of Classification Search
CPC ...... G01F 23/268; G01F 1/64; G01M 3/2876; G01M 3/184; E03C 1/102; E03C 1/106
USPC ........................................................ 137/218
See application file for complete search history.

(56) References Cited

U.S. PATENT DOCUMENTS

| | | | | | |
|---|---|---|---|---|---|
| 4,241,752 | A | | 12/1980 | Ackroyd | |
| 4,499,640 | A | | 2/1985 | Brenton et al. | |
| 5,046,525 | A | * | 9/1991 | Powell | E03C 1/106 |
| | | | | | 137/527 |
| 5,181,022 | A | | 1/1993 | Schupp | |
| 5,291,791 | A | | 3/1994 | Lucas et al. | |
| 5,421,210 | A | | 6/1995 | Kobayashi et al. | |
| 5,425,393 | A | | 6/1995 | Everett | |
| 5,520,207 | A | * | 5/1996 | Newsome | F16K 37/0041 |
| | | | | | 137/15.01 |
| 5,566,704 | A | * | 10/1996 | Ackroyd | E03C 1/106 |
| | | | | | 137/557 |
| 6,325,090 | B1 | * | 12/2001 | Horne | E03C 1/108 |
| | | | | | 137/512 |
| 6,349,736 | B1 | * | 2/2002 | Dunmire | E03B 7/078 |
| | | | | | 137/15.19 |
| 6,513,543 | B1 | * | 2/2003 | Noll | E03C 1/106 |
| | | | | | 137/454.2 |
| 6,581,626 | B2 | * | 6/2003 | Noll | F16K 15/066 |
| | | | | | 137/454.2 |
| 7,821,411 | B1 | | 10/2010 | Ward | |
| 10,127,790 | B2 | | 11/2018 | Doughty et al. | |
| 10,373,471 | B2 | | 8/2019 | Doughty et al. | |
| 2004/0134537 | A1 | * | 7/2004 | Noll | F16K 15/063 |
| | | | | | 137/512 |
| 2006/0185731 | A1 | * | 8/2006 | Grable | E03C 1/106 |
| | | | | | 137/115.13 |
| 2007/0240765 | A1 | * | 10/2007 | Katzman | E03C 1/106 |
| | | | | | 137/218 |
| 2010/0201118 | A1 | | 8/2010 | Anton et al. | |
| 2013/0180318 | A1 | | 7/2013 | Howard et al. | |
| 2015/0338252 | A1 | | 11/2015 | Schmidt et al. | |
| 2019/0035252 | A1 | | 1/2019 | Doughty et al. | |
| 2020/0141773 | A1 | | 5/2020 | Burke et al. | |
| 2020/0370691 | A1 | * | 11/2020 | Doughty | F16L 27/125 |
| 2021/0172157 | A1 | * | 6/2021 | Burke | F16K 37/0025 |
| 2022/0170769 | A1 | | 6/2022 | Ebert et al. | |
| 2022/0178121 | A1 | | 6/2022 | Castrigno | |
| 2022/0252170 | A1 | * | 8/2022 | Simon | E03B 7/075 |
| 2022/0333360 | A1 | * | 10/2022 | Burke | E03B 7/075 |
| 2023/0193608 | A1 | * | 6/2023 | Howell | E03C 1/057 |
| | | | | | 137/78.1 |
| 2024/0036226 | A1 | | 2/2024 | Castrigno et al. | |

FOREIGN PATENT DOCUMENTS

| | | |
|---|---|---|
| WO | 2017197021 A1 | 11/2017 |
| WO | 2020023586 A1 | 1/2020 |
| WO | 2022125618 A1 | 6/2022 |

OTHER PUBLICATIONS

WATTS Engineering Specification, Series 957, 957N, 957Z Reduced Pressure Zone Assemblies, 2020, 4 pages.

WATTS Engineering Specification, Series LF909 Reduced Pressure Zone Assembly, 2023, pp. 1-4.

WATTS Installation, Maintenance, and Repair Manual Series 909, LF909, 909RPDA Reduced Pressure Zone Assemblies Reduced Pressure Detector Assemblies, 2023, pp. 1-8.

International Preliminary Report on Patentability from corresponding PCT Appln. No. PCT/US21/62336, dated Feb. 18, 2022, 9 pages.

Office Action from corresponding U.S. Appl. No. 17/115,682, dated Sep. 2, 2022. 12 pages.

Final Office Action from corresponding U.S. Appl. No. 17/115,682, dated Apr. 12, 2023. 14 pages.

Office Action from related Australian Appln. No. 2021394753, dated Jun. 24, 2023. 3 pages.

International Search Report and Written Opinion from corresponding PCT Appln. No. PCT/US21/62336, dated Dec. 8, 2020. 12 pages.

"Avoid the call at 3 a.m. when your mechanical room is underwater!", PF-ACV FloodProtections 1425, a Watts Water Technologies Company, 2014. 2 pages.

Gangl, et al. "Influence of Measurement Inaccuracies at a Storage Tank on Water Losses", IWA Water Loss Conferences 2007, Bucharest, Conference Proceedings vol. II. pp. 474-484.

"Electromagnetic Flow Meter", Flow Knowledge, Keyence Amercia, May 29, 2018. pp. 1-5.

Office Action from corresponding U.S. Appl. No. 17/115,682, dated Sep. 28, 2022. 15 pages.

Extended European Search Report from related Application No. 21904305.6, dated Dec. 18, 2023. 8 pages.

* cited by examiner

300

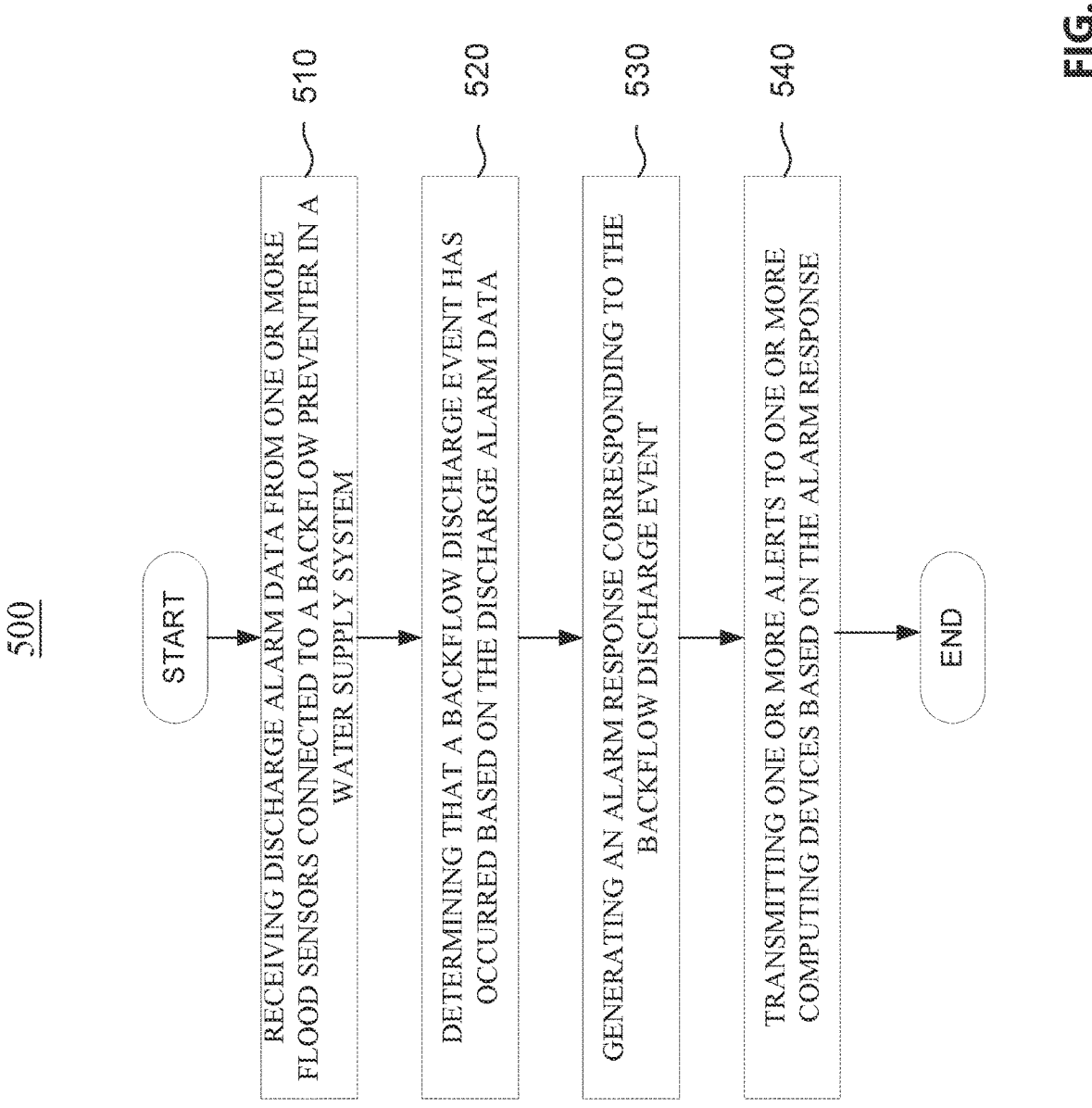

500

START

RECEIVING DISCHARGE ALARM DATA FROM ONE OR MORE FLOOD SENSORS CONNECTED TO A BACKFLOW PREVENTER IN A WATER SUPPLY SYSTEM — 510

DETERMINING THAT A BACKFLOW DISCHARGE EVENT HAS OCCURRED BASED ON THE DISCHARGE ALARM DATA — 520

GENERATING AN ALARM RESPONSE CORRESPONDING TO THE BACKFLOW DISCHARGE EVENT — 530

TRANSMITTING ONE OR MORE ALERTS TO ONE OR MORE COMPUTING DEVICES BASED ON THE ALARM RESPONSE — 540

END

FIG. 5

BACKFLOW ALERT SYSTEM

CROSS-REFERENCE TO RELATED APPLICATIONS

This application claims priority to U.S. Application No. 63/438,763, filed Jan. 12, 2023, and is a continuation-in-part of U.S. application Ser. No. 17/115,682, filed Dec. 8, 2020, and is a continuation-in-part of PCT/US21/62336, filed Dec. 8, 2021, all of which are fully incorporated herein by reference.

TECHNICAL FIELD

The present disclosure relates to fluid detection systems and methods using the same. In particular, the present disclosure relates to fluid detection systems for use with fluid supply equipment such as backflow prevention devices and relief valves.

BACKGROUND

Water supply systems includes plumbing consisting of pipes and valves configured to regulate water flow from a source to a destination. The plumbing pipes are fitted with valves to control the water flow rate through the pipes. Some valves include backflow preventer valves that prevent water backflow in the opposite direction of the normal water flow. Backflow preventer valves may also be fitted with relief valves to allow water to escape or discharge from the valve assembly. Once a relief valve is opened, water flow through the water supply system may be interrupted.

FIG. 1 depicts one example of a fluid supply system that includes a backflow preventer. System includes a strainer 101 that is includes an inlet 103 that receives a fluid (e.g., water) from a supply, such as a municipal water supply. Strainer 101 is coupled to an inlet side of backflow preventer 105. The outlet side of backflow preventer 105 is coupled to a proximal end of a supply pipe 111. Backflow preventer includes an upstream shutoff valve 107, a double check valve assembly (DCVA) 108, and a downstream shutoff valve 109. The distal end of supply pipe 111 conveys water to a destination, such as a building. Backflow preventer 105 is also coupled to a discharge pipe 113. In normal operation fluid such as water is conveyed under pressure from the supply to inlet 103. The pressure from the supply sufficiently biases the fluid in the forward direction to keep the check valves in DCVA 108 open and allow the fluid to flow through pipe 111 to the destination/building in a forward direction. When pressure is lost upstream of backflow preventer 105, however, one or both of the check valves in DCVA 108 will close to prevent backflow of fluid into the supply.

Backflow preventer 105 may operate in a normal (flow) condition for many years without any backflow events. During that time, mechanical components within backflow preventer 105 may corrode or otherwise degrade such that they might not function as intended during a backflow event. For example, one or more of the double check valves in DCVA 108 may not fully close during a backflow event, resulting in leakage of back flowing fluid. To address that issue, backflow preventer 105 is fluidly coupled to a discharge pipe 113 and is configured to direct fluid leaking through DCVA 108 in a backflow condition to discharge pipe 113 such that the leaking fluid does not enter the supply. While redirecting leaking fluid into discharge pipe 113 can prevent contamination of the supply, the discharge of fluid from discharge pipe 113 may be problematic. For example, fluid discharged from discharge pipe 113 may flood the surrounding environment, which may cause substantial damage—particularly when the outlet of discharge pipe 113 is within a mechanical room of a building. Additionally, if someone closes or partially closes either of the shut-off valves 107, 109 on a fire sprinkler backflow, water may not pass through the backflow preventor 105 in sufficient volume and/or pressure to enable the sprinkler system to function correctly, thereby creating a safety hazard.

The present disclosure therefore relates generally to backflow alert systems, and more particularly to monitoring backflow discharge systems.

BRIEF DESCRIPTION OF THE DRAWINGS

FIG. 5 depicts a flow chart of a computer-implemented method for monitoring backflow discharge systems, in accordance with an embodiment of the present disclosure.

DETAILED DESCRIPTION

Figure 1:
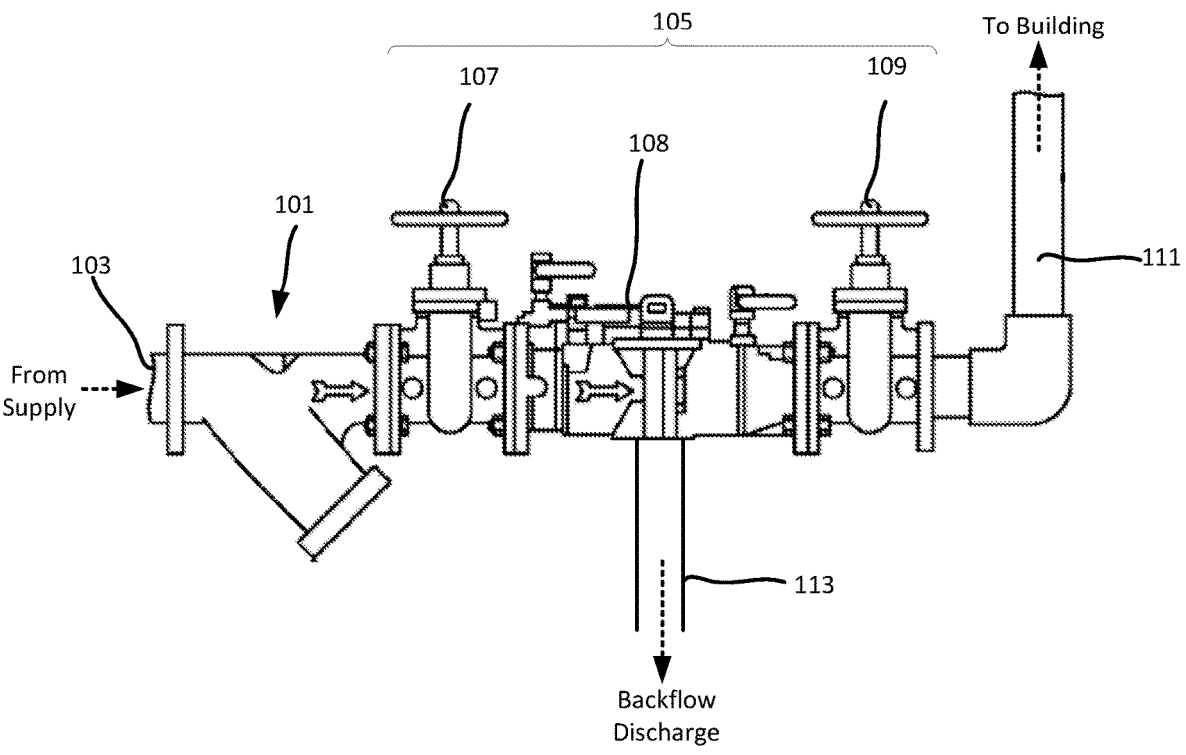
FIG. 1 is a schematic drawing of a prior art fluid supply system including a backflow preventer.

The present disclosure addresses the problem of preventing disrupted water flow in a fire protection system. The present disclosure also relates to computer-implemented methods, algorithms, software, and applications for monitoring backflow discharge systems.

Embodiments described herein may be directed to a water supply system configured as a fire sprinkler system, wherein if a shut-off valve is partially or completely closed to prevent or impede water flow through the water system in sufficient volume to function correctly to extinguish a fire, then a life safety issue becomes apparent. An example solution may include installing a tamper switch on each shut-off valve, wherein the tamper switch may be directly or indirectly in communication (e.g., wired or wirelessly) with a fire panel (e.g., Building Management System, BMS) such that if an attempt is made to close the shut-off valve, the tamper switch may be configured to detect the attempt and transmit a signal to the fire panel triggering the building fire alarm as well as sending an alert to the local fire department and/or the facility owner.

Embodiments described herein may also be directed to address the problem of backflow valves configured as a Reduced Pressure Zone (RPZ) device type, wherein if the RPZ device realizes a discharge event, according to its design intent, water may not be able to pass through the RPZ device at the designed volume/pressure to the sprinkler system. As a result, the discharge event may render the RPZ device inoperable due to the interrupted or reduced waterflow.

Embodiments described herein may include flood sensors installed within the water supply system configured to be connected (wired or wirelessly) to the fire panel (e.g., BMS) or to a tamper switch (as a pass-through device) to detect interrupted water flow through the water supply system. For example, in an embodiment, when a backflow discharge event occurs, a signal may be sent to the fire panel triggering the building fire alarm as well as sending an alert to the local fire department and/or facility owner.

Embodiments described herein may include a sprinkler backflow alert system including a sprinkler system, a building fire panel, a backflow preventor including at least one shut-off valve, a fluid detection system, and a tamper switch. The backflow preventor may be fluidly coupled upstream of the sprinkler system. The fluid detection system is configured to detect a discharge of water from the backflow preventor and generate a water discharge signal corresponding to the backflow discharge. The tamper switch is configured to detect a change in a position of the at least one shut-off valve and generate a tamper signal in the event the at least one shut-off valve is closed or partially closed. When a backflow discharge event occurs, a signal is sent to the fire panel triggering the building fire alarm as well as sending an alert to the local fire department and facility owner.

In an embodiment, the fluid detection system may be installed proximate to a relief valve of the backflow preventer and configured to detect fluid discharge from the relief valve.

The present disclosure will now be described in detail with reference to the Figures.

Figure 2:
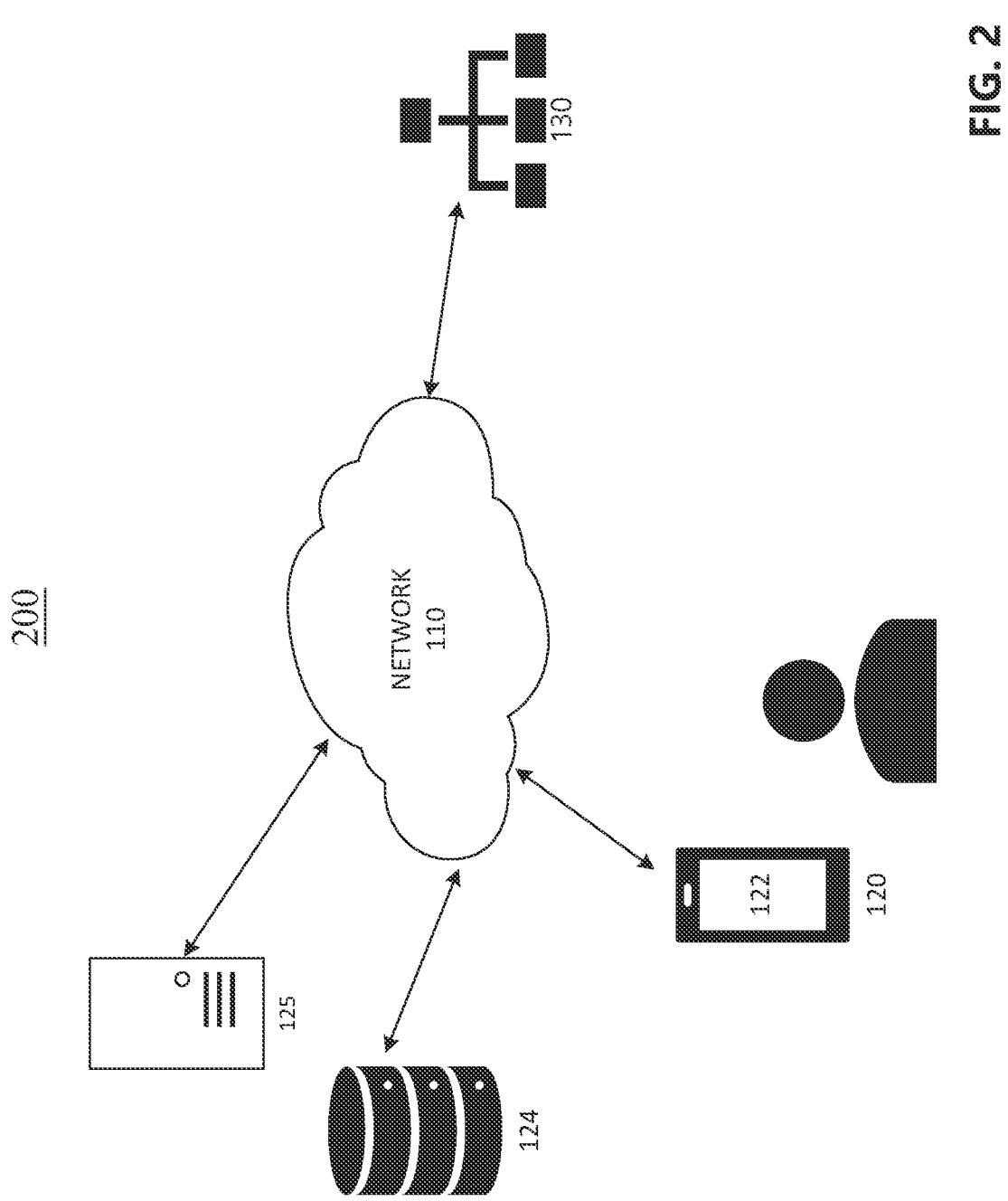
FIG. 2 depicts a functional block diagram illustrating a distributed data processing environment for monitoring backflow discharge systems, in accordance with an embodiment of the present disclosure.

FIG. 2 depicts a functional block diagram illustrating a distributed data processing environment 200 for monitoring backflow discharge systems, in accordance with an embodiment of the present disclosure. FIG. 2 provides only an illustration of one embodiment of the present disclosure and does not imply any limitations with regard to the environments in which different embodiments may be implemented. In the depicted embodiment, distributed data processing environment 200 includes computing device 120 (with user interface 122), server 125, and database 124 interconnected to water supply system 130 over network 110. Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between computing device 120, water supply system 130, server 125, and database 124. Distributed data processing environment 200 may also include additional servers, computers, sensors, or other devices not shown.

Computing device 120 operates to execute at least a part of a computer program for monitoring backflow discharge systems. In an embodiment, computing device 120 may be communicatively coupled with a microphone (not shown) or the microphone may be one of computing device 120 components. Computing device 120 be configured to send and/or receive data from network 110. In some embodiments, computing device 120 may be a management server, a web server, or any other electronic device or computing system capable of receiving and sending data. In some embodiments, computing device 120 may be a laptop computer, tablet computer, netbook computer, personal computer (PC), a desktop computer, a smart phone, or any programmable electronic device capable of communicating with database(s) 124, server(s) 125 via network 110. Computing device 120 may include components as described in further detail in FIG. 5.

Computing device 120 may also be configured to receive, store, and process discharge alarm data received by computing device 120. Computing device 120 may be configured to store the discharge alarm data in memory of computing device 120 or transmit the discharge alarm data to database 124 or server 125 via network 110. The discharge alarm data may be processed by one or more processors of computing device 120 or by one or more processors associated with server(s) 125 in a cloud computing network.

Database 124 operates as a repository for data flowing to and from network 110. Examples of data include user data, device data, network data, discharge alarm data, flood sensor data, tamper switch data, and data corresponding to device status information, device identifier information, device location information, device history information. A database is an organized collection of data. Database 124 can be implemented with any type of storage device capable of storing data and configuration files that can be accessed and utilized by computing device 120, such as a database server, a hard disk drive, or a flash memory. In an embodiment, database 124 is accessed by computing device 120 to store data corresponding to temperature sensor data. In another embodiment, database 124 is accessed by computing device 120 to access user data, device data, network data, temperature sensor and data corresponding to water supply system 130 gathered by sensors connected within water supply system 130. In another embodiment, database 124 may reside elsewhere within distributed network environment 200 provided database 124 has access to network 110.

Server 125 can be a standalone computing device, a management server, a web server, or any other electronic device or computing system capable of receiving, sending, and processing data and capable of communicating with computing device 120 via network 110. In other embodiments, server 125 represents a server computing system utilizing multiple computers as a server system, such as a cloud computing environment. In yet other embodiments, server 125 represents a computing system utilizing clustered computers and components (e.g., database server computers, application server computers, etc.) that act as a single pool of seamless resources when accessed within distributed data processing environment 200. Server 125 may include components as described in further detail in FIG. 6.

Figure 3:
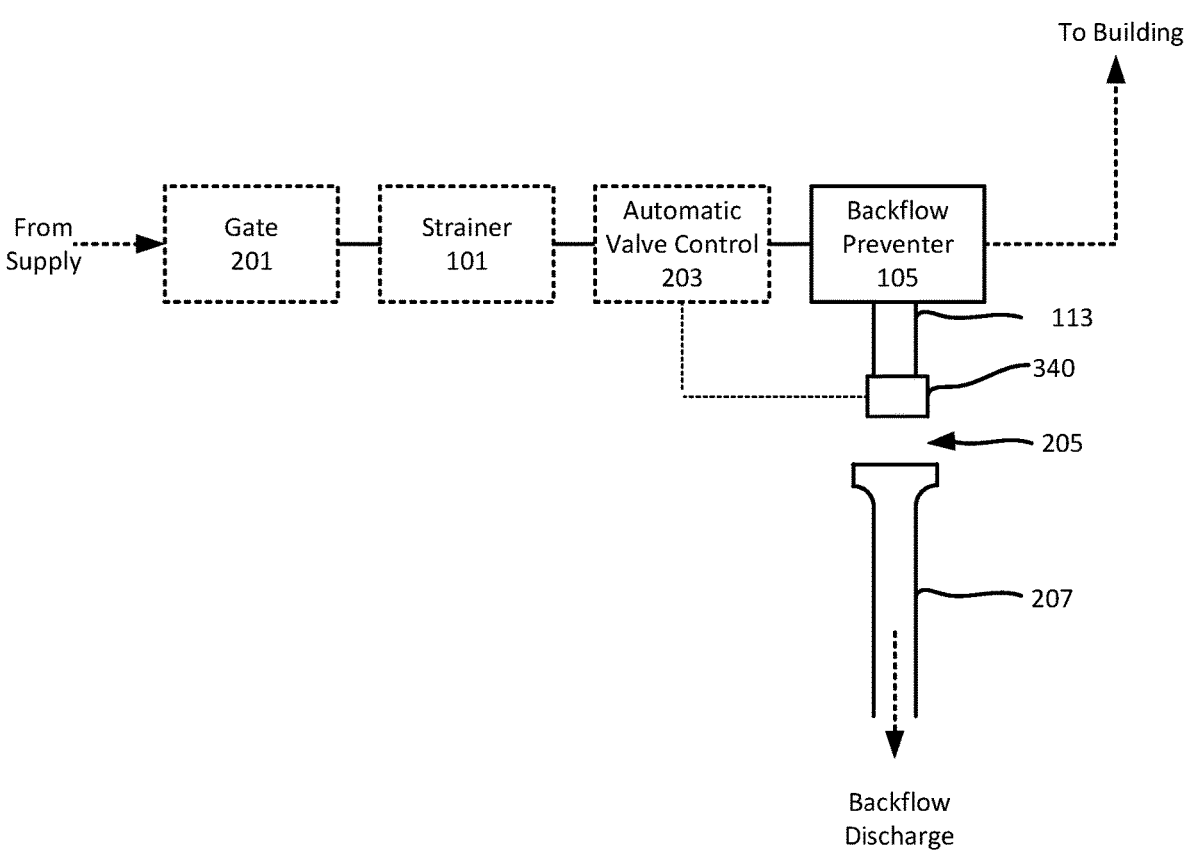
FIG. 3 is a schematic drawing illustrating one example of a fluid supply system including a backflow preventer and a fluid detection system consistent with the present disclosure.

FIG. 3 is a block diagram of one example of a fluid supply system including a backflow preventer and a fluid detection system consistent with the present disclosure. System 300 includes a backflow preventer 105 and a discharge pipe 113. System 300 can also include can include a gate valve 201, strainer 101, and automatic valve control 203, but such components are not required. When used, the gate valve 201 includes an inlet that is fluidly coupled to a fluid source such as a municipal water supply. Gate valve 201 further includes a valve (not shown) that may be used to shut off the supply of fluid to system 300. Strainer 101, when used, is fluidly coupled to the gate valve 201 (or directly to the fluid source) and is configured to remove solids that may be present within a supplied fluid. Automatic valve control 203, when used, has an inlet that is fluidly coupled to the strainer 101, gate valve 201, and/or the fluid source. Automatic valve control 203 may also have an outlet that is fluidly coupled to an inlet of a backflow preventer 105. In any case, automatic valve control 203 may be configured to control one or more valves, e.g., in backflow preventer 105, automatic valve control 203, gate valve 201, etc., e.g., in response to a control signal.

Backflow preventer 105 includes an inlet and an outlet. The inlet of backflow preventer 105 is fluidly coupled (or configured to be fluidly coupled) to the fluid supply and/or one or more upstream components, such as gate valve 201, strainer 101, automatic valve control 203, or the like. The outlet of backflow preventer 105 is fluidly coupled (or configured to be fluidly coupled) to a destination for a supplied fluid. In this case the outlet of backflow preventer 105 is fluidly coupled to one or more outlets within a building, but backflow preventer 105 may be coupled to any type of destination, such as a storage tank, a fire hydrant, etc. In general, backflow preventer 105 is configured to permit forward fluid flow under normal operating conditions (i.e., when fluid is supplied under adequate pressure), and to limit or prevent backflow of fluid in the event there is a loss of pressure.

Non-limiting examples of suitable backflow preventers that may be used as backflow preventer 105 include backflow preventers produced and sold by WATTS Water Technologies, Inc., such as but not limited to the WATTS 957 RPZ backflow preventer, the WATTS series LF909 reduced pressure zone assembly, the Watts 909 series backflow preventers, combinations thereof, and the like. Of course, such backflow preventers are enumerated for the sake of example only, and any suitable backflow preventer that may be used. In embodiments, backflow preventer 105 includes at least one check valves that is biased in an open position by a fluid when a pressure of the fluid is above a threshold pressure, but which is in a closed position when the pressure of the fluid is below the threshold pressure.

In addition to being fluidly coupled to a fluid source and a fluid destination (e.g., a building), backflow preventer 105 is also fluidly coupled (or configured to fluidly couple) to a discharge pipe 113. Consistent with the foregoing discussion, discharge pipe 113 generally functions to redirect fluid that may leak through backflow preventer 105 away from the fluid source. The flow of fluid into discharge pipe 113 may be caused by various things, such as a backflow event or a problem with backflow preventer 105 (e.g., a malfunctioning check valve therein). Alternatively, fluid flow into discharge pipe 113 may happen even when backflow preventer 105 is functioning properly. In any case, fluid within discharge pipe 113 (also referred to herein as leakage or flood flow) may flow downstream through fluid detection system 340, through an air gap 205, and into a discharge conduit 207.

Figure 4:
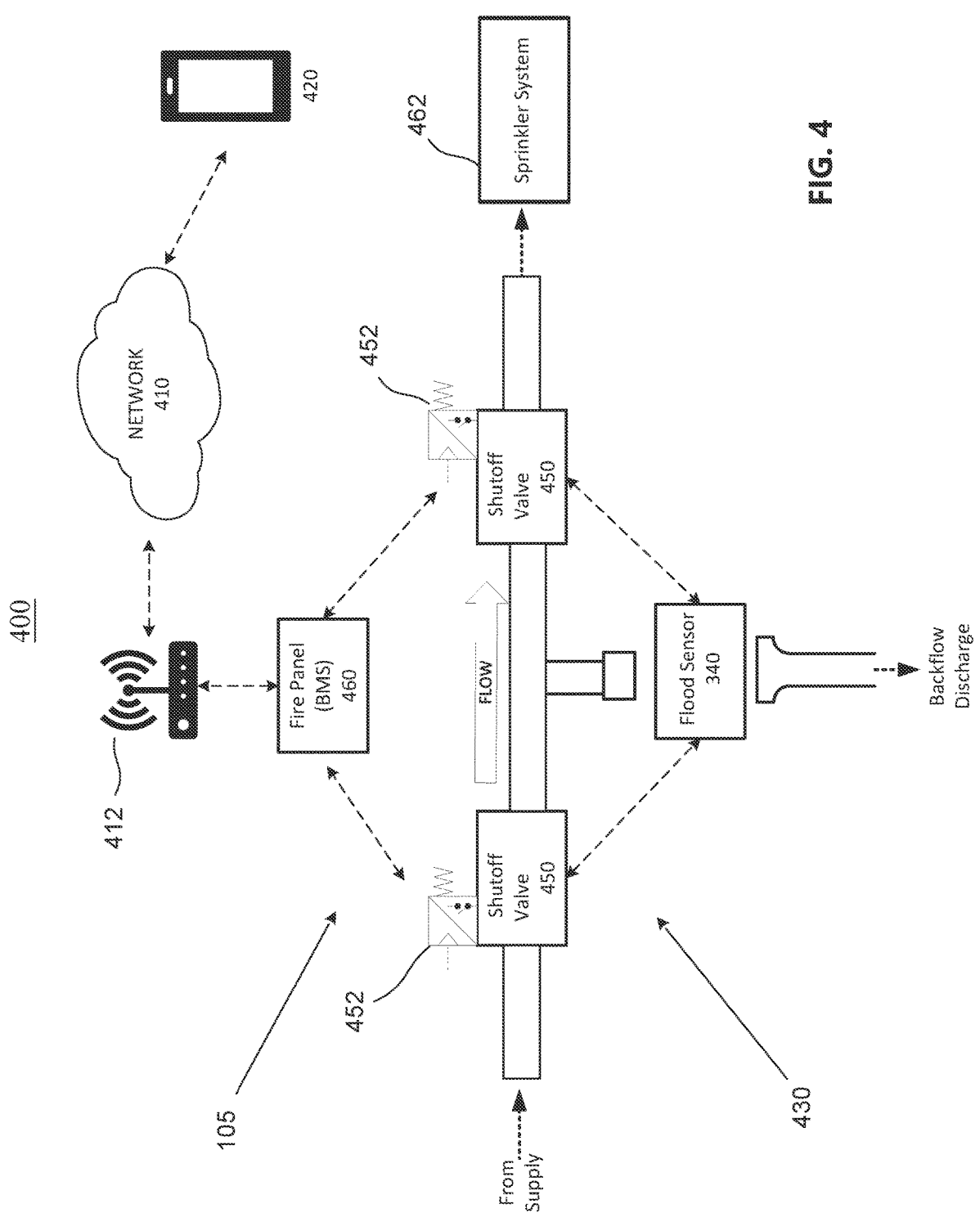
FIG. 4 depicts a network diagram of a system for monitoring backflow discharge systems, in accordance with an embodiment of the present disclosure.

FIG. 4 depicts a network diagram of a system 400 for monitoring backflow discharge systems, in accordance with an embodiment of the present disclosure. The system 400 may include network 410 configured to facilitate communication between computing device 420 and water supply system 430 via router 412. In an embodiment, water supply system 430 may include one or more backflow preventers 105, one or more fluid detection systems 340 (also referred to as flood sensors), and one or more tamper switches 452. Non-limiting examples of a backflow preventer and fluid detection system/flood sensor consistent with the present disclosure are described Ser. No. 17/115,682, filed Dec. 8, 2020, and PCT/US21/62336, filed Dec. 8, 2021, both of which are fully incorporated herein by reference. The water supply system 430 may be configured to selectively provide a supply of water to one or more sprinkler systems 462 located downstream of the backflow preventor 105. The sprinkler system 462 may include any known sprinkler system and may include, for example, one or more sprinklers.

The water supply system 430 may be in communication with fire panel 460 or a building management system (BMS). Flood sensor 340 may be in communication with fire panel 460 via backflow preventer 105 and/or a connected tamper switch 452 that are in communication with fire panel 460. Non-limiting examples of suitable tamper switches that may be used as tamper switches 452 include tamper switches produced and sold by WATTS Water Technologies, Inc., such as but not limited to the WATTS OSY-TS tamper switch and the like. Of course, such tamper switches are enumerated for the sake of example only, and any suitable tamper switch may be used.

Flood sensor 340 may be configured to detect water discharge from backflow preventer 105 and/or water supply flow from a water source to a building in any manner known to those skilled in the art including, but not limited to, detecting changes in capacitance as described Ser. No. 17/115,682 and/or PCT/US21/62336. For example, when a backflow discharge event occurs, flood sensor 340 may be configured to detect the backflow discharge event and record the event for communication to fire panel 460. In an embodiment, flood sensor 340 may be configured to generate and transmit a signal corresponding to the backflow discharge event to the fire panel 460. In an embodiment, the signal sent to fire panel 460 may be configured to trigger the building fire alarm as well as transmitting an alert to the local fire department and/or to the building facility owner. In an embodiment, flood sensor 340 may be installed within or adjacent to backflow preventer 105 to detect a discharge event associated with backflow preventer 105. For example, a discharge event may include any event corresponding to a release of water from or within proximity of backflow preventer 105. The flood sensor 340 may be either connected directly to the fire panel 460 and/or to the tamper switch 452 [e.g., as a pass through device], such that when a backflow discharge event occurs, a signal is sent to the fire panel 460 triggering the building fire alarm as well as sending an alert to the local fire department and/or facility owner.

In an embodiment, backflow preventer 105 may be configured to include one or more tamper switches 452 configured to detect a change in the position of one or more of the shut-off valves 450 (e.g., but not limited to, upstream shutoff valve 107 and/or a downstream shutoff valve 109) associated with backflow preventer 105. For example, tamper switch 452 may be associated with and/or located on one or more (e.g., each) of the shut-off valves 450 of the backflow preventer 105 such that the tamper switch 452 may be configured to generate and/or transmit (i.e., wired, wirelessly) a signal to fire panel 460 in the event the shut-off valve 450 is closed or partially closed. The signal may be configured to trigger the building fire alarm as well as sending an alert to the local fire department and/or facility owner.

FIG. 5 depicts a flow chart of a computer-implemented method 500 for monitoring backflow discharge systems, in accordance with an embodiment of the present disclosure. In an embodiment, computer-implemented method 500 may include one or more processors configured for receiving 510 discharge alarm data from one or more flood sensors connected to a backflow preventer in a water supply system. The method 500 may include one or more processors configured for determining 520 that a backflow discharge event has occurred based on the discharge alarm data. One or more processors may be configured for generating 530 an alarm response corresponding to the backflow discharge event and for transmitting 540 one or more alerts to one or more computing devices based on the alarm response.

In an embodiment, the discharge alarm data may include flood sensor data generated by the one or more flood sensors and tamper switch data generated by one or more tamper switches associated with the backflow preventer. The one or more flood sensors may be installed proximate to a relief valve of the backflow preventer and configured to detect fluid discharge from the relief valve.

In an embodiment, determining 520 that the backflow discharge event has occurred may further include may include one or more processors configured for receiving the flood sensor data from the one or more flood sensors, and processing the flood sensor data to identify a first sensor of the one or more sensors that detected a fluid discharge, wherein the fluid discharge may correspond to the backflow discharge event.

The method 500 may include determining a severity level of the backflow discharge event based on the discharge alarm data. For example, the discharge alarm data may include data corresponding to the discharge event having a severity level of low, medium, or high indicating a discharge water flow rate, wherein a maximum discharge water flow rate may correspond to a high severity level and a minimum discharge water flow rate may correspond to a low severity level.

In an embodiment, responsive to determining that the severity level exceeds a threshold (e.g., low, medium, high), the method 500 may include generating an emergency alarm response corresponding to the severity level. Further, the method may be configured cause the emergency alarm response to be transmitted to the one or more computing devices.

In an embodiment, computer-implemented method 500 may include one or more processors configured for determining that a shut-off valve was energized based on the tamper switch data, wherein the backflow discharge event may include an indication that the shut-off valve was energized.

In an embodiment, computer-implemented method 500 for generating 530 the alarm response may further include generating an alarm configured to trigger a building fire alarm, generating a first alert configured to notify a local fire department, and generating a second alert configured to notify a facility owner associated with the computing device monitoring the water supply system.

Figure 6:
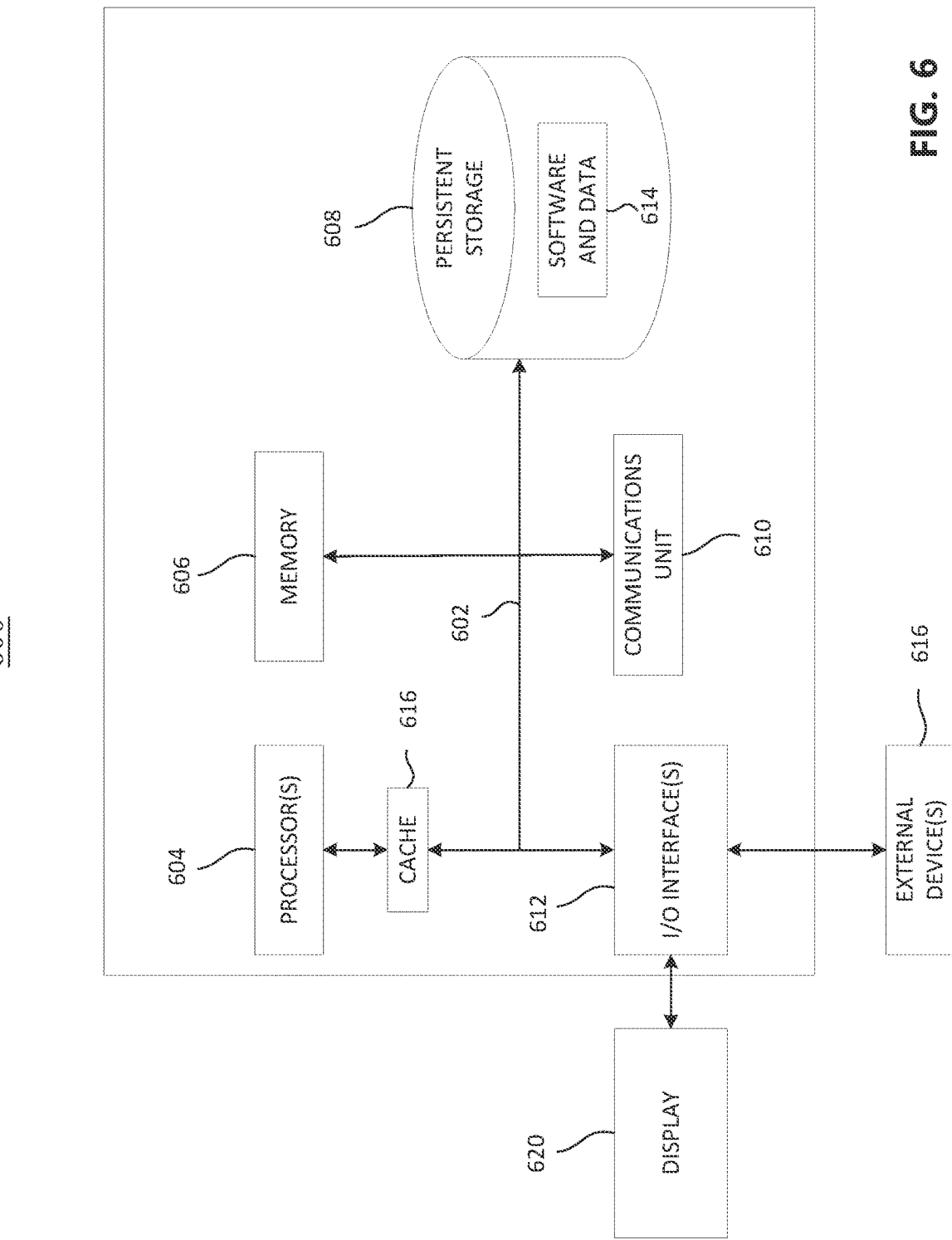
FIG. 6 depicts a block diagram of a computing device of the distributed data processing environment of FIG. 2, in accordance with an embodiment of the present disclosure.

FIG. 6 depicts a block diagram of a computing device 600 of the distributed data processing environment of FIG. 2, in accordance with an embodiment of the present disclosure. For example, FIG. 6 depicts a block diagram of computing device 600 suitable for server(s) 125 and computing device 120, in accordance with an illustrative embodiment of the present disclosure. It should be appreciated that FIG. 6 provides only an illustration of one implementation and does not imply any limitations with regard to the environments in which different embodiments may be implemented. Many modifications to the depicted environment may be made.

Computing device 600 includes communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Programs may be stored in persistent storage 608 and in memory 606 for execution and/or access by one or more of the respective computer processors 604 via cache 616. In an embodiment, persistent storage 608 includes a magnetic hard disk drive. Alternatively, or in addition to a magnetic hard disk drive, persistent storage 608 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Programs, as described herein, may be downloaded to persistent storage 508 through communications unit 610.

I/O interface(s) 612 allows for input and output of data with other devices that may be connected to computing device 120. For example, I/O interface 612 may provide a connection to external devices 618 such as image sensor 130, a keyboard, a keypad, a touch screen, and/or some other suitable input device. External devices 618 can also include portable computer readable storage media such as, for example, thumb drives, portable optical or magnetic disks, and memory cards. Software and data 614 used to practice embodiments of the present disclosure can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

Software and data 614 described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present disclosure may be a computer system, a computer-implemented method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A backflow alert system comprising:

a backflow preventor including at least one shut-off valve;

a fluid detection system configured to detect a discharge of water from the backflow preventor and generate a water discharge signal corresponding to the backflow discharge; and a tamper switch configured to detect a change in a position of the at least one shut-off valve and generate a tamper signal in the event the at least one shut-off valve is closed or partially closed.

2. The backflow alert system of claim 1, wherein the tamper signal is configured to trigger a building fire alarm.

3. The backflow alert system of claim 2, wherein the tamper signal is configured to cause an alert to be transmitted to at least one of a fire department or a facility owner.

4. The backflow alert system of claim 2, wherein the tamper signal is transmitted wireless to the building fire alarm.

5. The backflow alert system of claim 2, wherein the tamper switch is coupled via a wired connection to the building fire alarm.

6. The backflow alert system of claim 1, wherein the water discharge signal is transmitted to a building fire panel in response to the fluid detection system detecting the discharge of water from the backflow preventor.

7. The backflow alert system of claim 6, wherein the water discharge signal is transmitted to tamper switch and is transmitted from the tamper switch to the building fire panel.

8. The backflow alert system of claim 1, wherein the tamper switch is coupled to the at least one shut-off valve.

9. The backflow alert system of claim 1, wherein the fluid detection system includes at least one sensor configured to detect the discharge of water from the backflow preventor using capacitance.

10. A sprinkler backflow alert system comprising:

a sprinkler system;

a building fire panel;

a backflow preventor including at least one shut-off valve, the backflow preventor fluidly coupled upstream of the sprinkler system;

a fluid detection system configured to detect a discharge of water from the backflow preventor and generate a water discharge signal corresponding to the backflow discharge; and a tamper switch configured to detect a change in a position of the at least one shut-off valve and generate a tamper signal in the event the at least one shut-off valve is closed or partially closed.

11. The sprinkler backflow alert system of claim 10, wherein the tamper signal is configured to trigger a building fire alarm.

12. The sprinkler backflow alert system of claim 11, wherein the tamper signal is configured to cause an alert to be transmitted to at least one of a fire department or a facility owner.

13. The sprinkler backflow alert system of claim 11, wherein the tamper signal is transmitted wireless to the building fire alarm.

14. The sprinkler backflow alert system of claim 11, wherein the tamper switch is coupled via a wired connection to the building fire alarm.

15. The sprinkler backflow alert system of claim 10, wherein the water discharge signal is transmitted to the building fire panel in response to the fluid detection system detecting the discharge of water from the backflow preventor.

16. The sprinkler backflow alert system of claim 15, wherein the building fire panel is configured to trigger a building fire alarm in response to receipt of the water discharge signal.

17. The sprinkler backflow alert system of claim 15, wherein the water discharge signal is transmitted to tamper switch and is transmitted from the tamper switch to the building fire panel.

18. The sprinkler backflow alert system of claim 10, wherein the tamper switch is coupled to the at least one shut-off valve.

19. The sprinkler backflow alert system of claim 10, wherein the fluid detection system includes at least one sensor configured to detect the discharge of water from the backflow preventor using capacitance.

* * * * *